United States Patent [19]

McManus

[11] 4,448,528
[45] May 15, 1984

[54] PORTABLE LASER VERTICAL COLLIMATOR AND PLUMB LINE INDICATOR

[76] Inventor: Acie J. McManus, 5828 Parkdale, Dallas, Tex. 75227

[21] Appl. No.: 327,951

[22] Filed: Dec. 7, 1981

[51] Int. Cl.³ .............................................. G01C 9/14
[52] U.S. Cl. .................................... 356/250; 356/149
[58] Field of Search ................................ 356/250, 149

[56] References Cited

U.S. PATENT DOCUMENTS

| | | | |
|---|---|---|---|
| 3,771,876 | 11/1973 | Ljungdahl et al. | 356/250 |
| 3,858,984 | 1/1975 | Denton et al. | 356/250 |
| 4,183,667 | 1/1980 | Denton | 356/250 |

FOREIGN PATENT DOCUMENTS

| | | | |
|---|---|---|---|
| 967358 | 5/1975 | Canada | 356/250 |
| 1565838 | 4/1980 | United Kingdom | 356/250 |

*Primary Examiner*—Vincent P. McGraw
*Attorney, Agent, or Firm*—Gerald G. Crutsinger; John F. Booth; Monty L. Ross

[57] ABSTRACT

Apparatus for transferring a floor marking to a location on an overhead in direct true vertical relationship to the floor marking comprising a laser device generating a pair of beams directionally separated 180 degrees, gimbal mounted to swing free within a wind shielding housing, the housing having collapsible tripod legs with caging arms on each leg extending into the housing to engage and hold said laser in a centralized position when said legs are collapsed for transport of said apparatus.

10 Claims, 4 Drawing Figures

PORTABLE LASER VERTICAL COLLIMATOR AND PLUMB LINE INDICATOR

BACKGROUND AND BRIEF DESCRITION OF THE INVENTION

This invention relates to new and improved apparatus for transferring markings from a floor to a ceiling location in true vertical. In building construction and repair, it is frequently necessary to locate and mark a spot on a ceiling or overhead structure in accordance with a designer's plans for accurate location and installation of walls, electrical outlets, lighting fixtures, heating, ventilating or air conditioning ducts or the like.

Conventionally, workman lay out the location of such markings on the floor for ease and accuracy of measurement. Transferrance of these markings accurately to the ceiling or overhead has previously been costly and time consuming. By one technique, usually requiring two men, a conventional plumb bob is used to determine the ceiling spot location. Such a technique often requires an inordinate amount of time for the plumb bob to come to rest and accuracy may be poor when the wind interferes with the operation. Some prior art systems have used a light source (usually incoherent) and lens system to project a spot of light on to the overhead from the source accurately located on the floor. However, because several separate parts are needed to make up and mount the lens projection system, such a device is susceptible to the misalignment and inaccuracies resulting from even the normal and expected bumps and jolts encountered in use of the device in a construction environment. Similar devices using the coherent light of a laser beam to permit omission of the lens system still are subject to misalignment between the floor marking "pointer" and laser which is usually mounted some distance above the "pointer".

In the present invention, a "double-beam" laser is used. In such lasers, which are commercially available, light beams are emitted from both ends of the lasing element. In order to provide the properly aligned internal light reflections required for laser action, the partially reflective end walls of the laser element are required to be parallel to an extreme degree of accuracy. Thus, when the laser is operating, the light beams emitted are known to be aligned exactly 180 degrees opposite each other. Therefore, when one beam is directed to illuminate a floor marking from directly above, the other beam illuminates a spot on the overhead exactly vertical from the floor marking. By the alignment system of the present invention then at least one major source of inaccuracy of alignment has been eliminated.

It is a principal object of the present invention to provide a device to reduce the time and labor required to transfer location markings from one surface to another.

It is a further object to provide a device for the transfer of location markings from one surface to another with improved accuracy.

It is a still further object to provide a lightweight portable inexpensive tool useful for the transfer of location markings.

It is an even further object to provide a tool for the transfer of location markings which is simple, easy to operate and does not require special training or skill of the user.

An additional object is to provide a tool for the transfer of location markings which is rugged and not readily subject to damage or misalignment from ordinary on-the-job handling treatment.

BRIEF DESCRIPTION OF THE DRAWINGS

These and other objects and advantages of the present invention will become apparent from the following detailed description of a preferred embodiment thereof when read with reference to the accompanying drawings wherein:

Referring now to FIGS. 1 and 2 in a preferred embodiment the marking transfer device 10 of the present invention comprises a housing 11 including a cylindrical member 12, top cover 13 and bottom cover 14. The housing 11 has a tripod mounting, the legs 15 of which are adjustable in length by any conventional means such as twist clamps 16. The spread of the tripod legs 15 may be limited by chains or flexible ties 17 connected between the legs or feet 18 or the leg hinges 20 may be provided with stops in a conventional manner. End covers 13 and 14 are each provided with openings or transparent windows at approximately their centers 21 and 22 to allow the laser beams to be transmitted from the housing 11. Housing 11 serves as a wind shield as well as the mounting support for other components. The tubular wall portion 12 and covers 13 and 14 of housing 11 may be of any suitable material such as metal, opaque plastic or clear plastic as illustrated.

Figure 1:
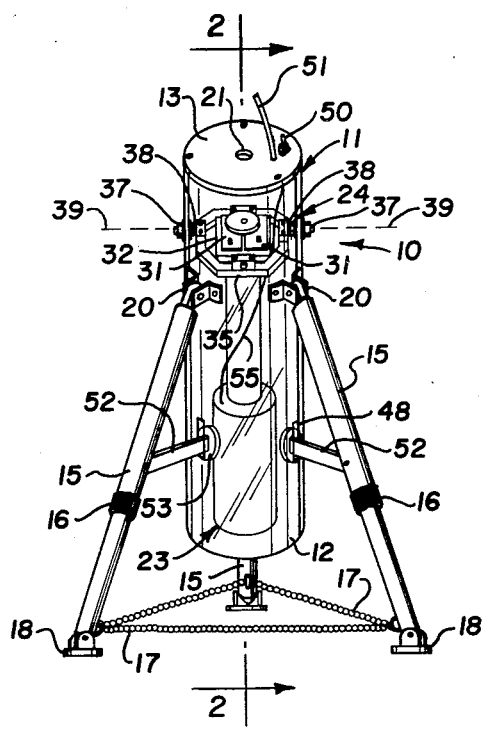
FIG. 1 is a view in perspective of one embodiment of the marking transfer device in the present invention.

A helium neon laser 23 of a conventional type is mounted pendulum fashion at the upper end of housing 11 by gimble assembly 24. Laser 23 may be a commercially available type such as, for example, model OEMOSR/14D from CW Radiation, Inc. of Pittsburg, Pa. In this particular model, the laser element, its necessary operational and control elements and electronics are supplied in an elongated, tubular casing 29 as depicted in the drawings.

Figure 3:
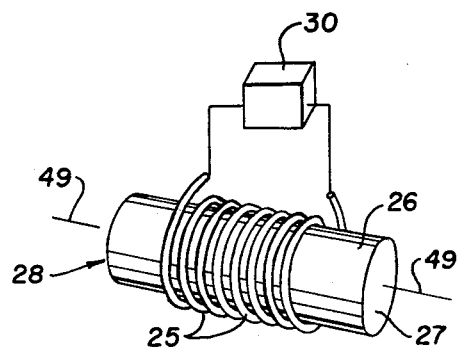
FIG. 3 is a schematic illustration of a laser of the type useful in the present invention; and, FIG. 4 is a bottom view of the balance weight assembly for "true vertical" adjustment of the device of the present invention.

As shown schematically in FIG. 3 the laser basically comprises an exciter in the form of a helical flash lamp 25 surrounding a tube 26 filled with a gas which can be stimulated to emit light. The two ends 27 and 28 of the tube 26 are optically flat and extremely accurately parallel. The surfaces of the two ends are coated to be light reflective. At least part of the coating on each of the tube ends 27 and 28 is designed to permit the exit of light, i.e. the laser beams. When the flash tube 25, which is controlled and activated by electronic circuitry 30, is fired the gas is stimulated to emit light. Multiple reflections of the emitted light between the end walls 27 and 28 of the tube 26 result in the laser beam 49. Laser action is sufficiently well known that a more detailed explanation is unnecessary here. Suffice it to say laser action in the gas cannot be achieved unless a substantial amount of the light emitted by the gas is continuously passed back and forth through the gas by multiple reflections between the two tube ends 27 and 28. Thus, when laser action takes place it is assured that the internal light reflections, and therefore the two emitted laser beams 49, are in exactly 180 degree opposite directions to an extreme degree of accuracy.

Figure 2:
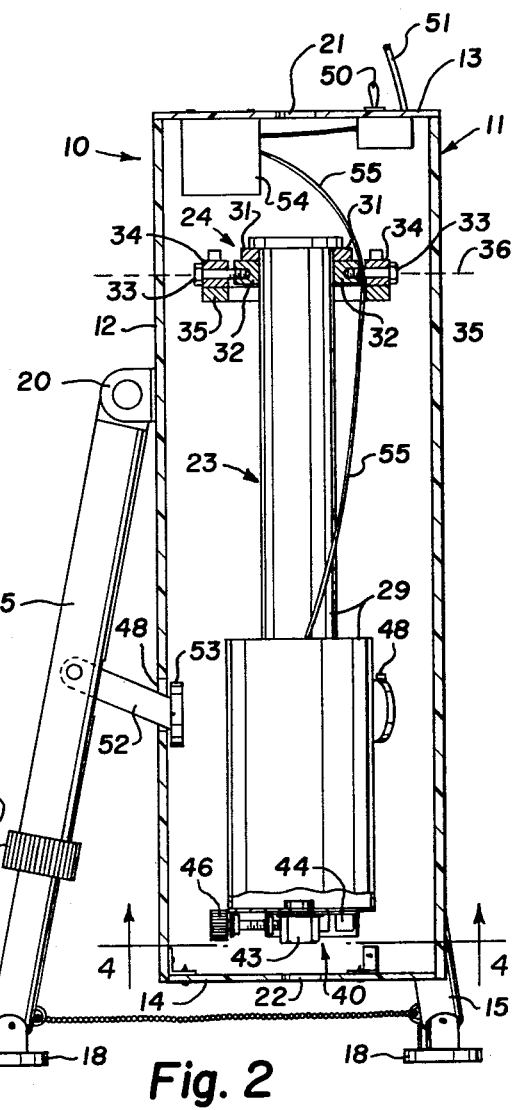
FIG. 2 is a side elevation partly in section of the device illustrating certain features of the invention.

Returning now to FIGS. 1 and 2, the casing 29 of laser 23 is clamped in a gimble assembly 24 by collars 31 of platform member 32, the inner "gimble ring." Platform member 32 is mounted on shafts 33 journaled in bearing block 34 of outer ring member 35 for free rotation about a first horizontal axis designated by reference numeral 36. Shafts 37 mounted to housing member 12 and journaled in bearing blocks 38 of outer ring member 35 support the ring member 35, platform member 32 and laser 23 for rotation about the second horizontal axis 39 at right angles to the first axis 36. Thus, laser 23 is mounted as a free pendulum which will come to rest with its center of gravity in true vertical alignment with the intersection of axes 36 and 39. Affixed to the bottom of laser 23 is a balance weight assembly 40. Adjustment of the vertical axis of the laser beams by means of weight assembly 40 will be explained subsequently.

In operation the marking transfer device 10 is set up over the floor marking location to be transferred to the overhead. The position of device 10 is adjusted until the "down" laser beam illuminates the floor marking location with the pendular laser at rest. The "up" laser beam, being precisely 180 degrees opposite the down beam, illuminates the spot on the over head which is precisely vertically above the floor marking location. The overhead illuminated location is then marked by chalk, ink or otherwise for later reference and use. It can be seen that the marking transfer device of the present invention is easily operable by one person unassisted.

Figure 4:
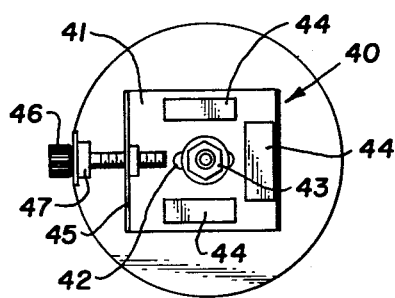

For details of the mechanism of the balance weight assembly 40 and its adjustment, reference is now made to FIG. 4. The balance weight assembly 40 comprises a plate 41 having a central opening slot 42. A hollow locking bolt 43 extends through the slot 42 and is threaded into the bottom plate of the housing 29 of laser 23. The head of bolt 43 secures the plate 41 to the laser housing 29. One or more balance weights 44 are affixed to the plate 41. Plate 41 further has a downturned flange 45 at one end. An adjustment thumb screw 46 is mounted through an extension 47 of the sidewall of laser housing 29 and is threaded to nut 48 affixed to flange 45.

When bolt 43 is loosened, thumbscrew 46 may be turned to shift the position of plate 41 and attached weights 44. In this manner the center of gravity of the pendular mass of the laser 23 can be adjusted so that the laser beams are precisely vertical when the laser 23, suspended as a free pendulum from its gimble mounting, is at rest. Such adjustment is initially made at the factory and once set, needs to be checked or confirmed only infrequently.

For this initial adjustment or subsequent confirmation, the transfer device 10 is placed over a floor point known to be in true vertical alignment with another point overhead. The transfer device 10 is positioned so the the "down" laser beam illuminates the floor marking with the laser 23 "pendulum" at rest. The balance weight assembly 40 and the position of the transfer device are then incrementally adjusted until the laser beams illuminate both the floor and the overhead markings simultaneously. If this "true vertical" adjustment cannot be achieved in this manner by manipulation of the balance weight assembly, collar clamps 31 may be loosened and the laser 23 repositioned slightly in its mounting and reclamped. In this way the center of gravity of the pendular mass is brought within the adjustment range of the balance weight assembly 40. If desirable, provision may be made for rotational adjustment of the balance weight assembly 40 for any required additional shift in the center of gravity.

When the true vertical setting has been achieved, locking bolt 43 is tightened to retain the balance weight in the correct position. The true vertical adjustment of the transfer device once set, ordinarily needs to be checked or confirmed perhaps only once every three or four months unless the device has been subjected to extremely rough handling or a severe shock.

In order to reduce the possibilities of bumps or shocks producing misalignment or maladjustment of the transfer device, provision is made to "cage" the pendular laser 23 during transfer between jobs or even between setups. Pivotally attached to each leg of the tripod stand are caging arms 52 which extend through slotted openings 48 in the wind shield housing 11 and terminate in padded feet 53. The position and length of the caging arms 52 is selected such that when the legs 15 are folded into the transport position lying along housing 12, the free end of the laser is supported in a generally centralized position by the pads of feet 53. At the next setup position when the legs of the transfer device are spread for use, laser pendulum 23 is automatically "uncaged" and set free for proper use.

The convenience and simplicity of the marking transfer device of the present invention is illustrated by the fact that the only operational control is the "on-off" switch 50. The laser unit 23 is powered by electrical energy supplied from an ordinary 110 volt, 60 cycle source through power cord 51, switch 50, transformer 54 and cable 55.

From the foregoing description of the present invention, many changes and modifications still within the spirit and scope of the teachings herein will occur to those skilled in the art and thus it is intended that this invention be limited only as set forth in the following claims.

What is claimed is:

1. Apparatus for transferring a floor marking to a location on an overhead in direct true vertical relationship to said floor marking comprising: a generally tubular housing means having essentially solid vertical walls shielding the interior of said housing from wind disturbance, the end walls of said housing having an area transparent to laser beams, said housing having legs pivotally attached thereto above its mid section providing collapsible tripod support therefor, tubular laser means generating a pair of laser beams directionally separated precisely 180 degrees, gimbal means near the upper end of said housing mounting said laser means near the upper end thereof in pendular fashion free to swing in any direction, said laser means being so positioned in said mounting means that a first of said beams is directed vertically downwardly and the other of said beams is directed vertically upwardly whereby when said floor marking is illuminated by said downwardly directed beam with said pendular mounted laser means at rest, said upwardly directed beam illuminates the point on the overhead in precise vertical relationship to said floor marking, and caging arm means attached to each of said legs and extending into the interior of said housing through openings in said vertical walls, said caging arm means being of such length as to hold said laser means in a generally centralized position within said housing when said tripod support is collapsed with said legs pivoted to rest against said housing.

2. The apparatus as defined in claim 1 further including adjustment means to alter the center of gravity of said laser means with respect to said mounting means.

3. The apparatus as defined in claim 2 wherein said adjustment means comprises a movable weight member affixed to the lower end of said laser means.

4. The apparatus as defined in any of one of claims 1 through 3 wherein said laser means is a helium-neon laser.

5. The apparatus as defined in any of one of claims 1-3 wherein the outward pivotal swing of said legs is limited.

6. The apparatus as defined in claim 5 wherein the outward pivotal swing of said legs is limited by flexible means interconnecting said legs.

7. The apparatus of claim 5 wherein said laser means is a helium-neon laser.

8. The apparatus of claim 6 wherein said laser means is a helium-neon laser.

9. The apparatus of any one of claims 1-3 wherein said legs are of adjustable length.

10. The apparatus as defined in claim 5 wherein said legs are of adjustable length.

* * * * *